US012380086B2

(12) United States Patent
Ng et al.

(10) Patent No.: US 12,380,086 B2
(45) Date of Patent: Aug. 5, 2025

(54) METHOD AND APPARATUS FOR FINE-GRAINED HIERARCHICAL LOCKING IN A MULTI-MASTER DATABASE SYSTEM

(71) Applicant: HUAWEI CLOUD COMPUTING TECHNOLOGIES CO., LTD., Gui Zhou Province (CN)

(72) Inventors: Jack Hon Wai Ng, Richmond Hill (CA); Per-Ake Larson, Etobicoke (CA); Alexandre Depoutovitch, Toronto (CA); Chong Chen, Richmond Hill (CA)

(73) Assignee: HUAWEI CLOUD COMPUTING TECHNOLOGIES CO., LTD., Gui Zhou Province (CN)

( * ) Notice: Subject to any disclaimer, the term of this patent is extended or adjusted under 35 U.S.C. 154(b) by 196 days.

(21) Appl. No.: 18/073,034

(22) Filed: Dec. 1, 2022

(65) Prior Publication Data
US 2024/0184766 A1    Jun. 6, 2024

(51) Int. Cl.
*G06F 16/23* (2019.01)
*G06F 16/27* (2019.01)

(52) U.S. Cl.
CPC ........ *G06F 16/2343* (2019.01); *G06F 16/273* (2019.01)

(58) Field of Classification Search
None
See application file for complete search history.

(56) References Cited

U.S. PATENT DOCUMENTS

| | | | | |
|---|---|---|---|---|
| 5,778,388 A | * | 7/1998 | Kawamura | G06F 11/1466 |
| | | | | 707/999.203 |
| 2008/0086470 A1 | * | 4/2008 | Graefe | G06F 16/2246 |
| 2011/0131192 A1 | * | 6/2011 | Finnie | G06F 16/2343 |
| | | | | 707/769 |
| 2019/0324673 A1 | * | 10/2019 | Graefe | G06F 3/0637 |
| 2023/0306012 A1 | * | 9/2023 | Li | G06F 16/2365 |

OTHER PUBLICATIONS

Jeffrey W. Josten, C. Mohan, Inderpal Narang, James Z. Teng, "DB2's Use of the Coupling Facility for Data Sharing.", IBM Systems Journal, vol. 36, p. 327-351, 1997.
Kevin Molloy, Daniel A. Menasce, "Method and Model to Access the Performance of Clustered Databases: The Oracle RAC Case", Proc. Computer Measurement Group Conf., Dec. 2010.

* cited by examiner

Primary Examiner — Amresh Singh

(57) ABSTRACT

A method of managing locks in a database is performed by a row lock manager of a database master. The method includes receiving, from a transaction executing on the database master, a row lock request for a row in the database. The row lock request includes a page in the database where the row is located. The row lock request also includes a row lock mode of sufficient strength to perform the transaction. Then, sending, to a page lock manager, a request for a covering lock of the page. The request specifies a page lock mode of sufficient strength to satisfy the row lock mode. Also, receiving, from the page lock manager, a grant of the page lock. The page lock includes information on row locks of rows located in the page. Then, granting, to the transaction, the row lock.

18 Claims, 10 Drawing Sheets

| Requested Mode | Held Mode | | | |
|---|---|---|---|---|
| | None | Shared | Shared Exclusive | Exclusive |
| Shared | OK | OK | OK | Wait |
| Shared exclusive | OK | OK | Wait | Wait |
| Exclusive | OK | Wait | Wait | Wait |

FIG. 8

| Row Lock Granted Mode — 902 | | |
|---|---|---|
| | Shared | Exclusive |
| Shared | Valid | Invalid |
| Shared Exclusive | Valid | Invalid |
| Exclusive | Valid | Valid |
| Page Lock Granted Mode — 904 | | |

FIG. 9

METHOD AND APPARATUS FOR FINE-GRAINED HIERARCHICAL LOCKING IN A MULTI-MASTER DATABASE SYSTEM

CROSS-REFERENCE TO RELATED APPLICATIONS

This is the first application filed for this invention.

FIELD OF THE INVENTION

This disclosure pertains generally to the field of multi-master database architecture and in particular to methods and apparatus for improving the efficiency of row lock operations.

BACKGROUND OF THE INVENTION

In a typical Online Transaction Processing (OLTP) database, data is organized in relational tables with rows and columns. Table rows are stored in data pages. Logical ownership of a row is protected by its row lock and physical read/write access to the page (stored in memory) containing the row is protected by a page lock. To read or write a particular row in a page, a transaction needs to obtain the row lock to declare its logical ownership of the row (with an appropriate lock mode) and the page lock to read or write the underlying page in memory consistently.

To provide concurrency to multiple active transactions while still preserving data correctness, rows in the same page can be locked by different transactions and the page can be accessed (read or written) by those active transactions in a well-defined, serialized order via the page lock.

Real-world applications and workloads commonly exhibit mixed access patterns, which may lead to a high amount of network communications amongst nodes in the clusters (database masters and MM service nodes) in production database systems in the cloud. If the amount of communications exceeds system limits it can lead to slow downs and increased latency in processing and network operations that degrade the responsiveness of the database system.

Therefore, there is a need for a multi-master database architecture with associated apparatus and methods, that obviates or mitigates one or more limitations in the prior art by improving the efficiency of how row locks and page locks are obtained and managed.

This background information is intended to provide information that may be of possible relevance to the present invention. No admission is necessarily intended, nor should be construed, that any of the preceding information constitutes prior art against the present invention.

SUMMARY OF THE INVENTION

Embodiments of the present disclosure generally provide for methods and apparatus for locking rows and managing row locks in a Multi-master (MM) database environment. A hierarchical, "hybrid" (combining physical page locks and logical row locks) locking protocol may be used that satisfies correctness, performance, and scalability requirements for cloud based MM databases. This may be achieved by having a "covering" page lock held in a sufficiently strong mode by a database master (more simply referred to as a "master") and having sufficiently complete row lock information (of the covering page) available to the master. Properties of physical page locks may be exploited to include row lock information and distribute this information to other masters for row lock scheduling and arbitration. An important consideration is to include the minimal information needed by the database master to schedule and arbitrate lock rows to reduce the network communications overhead required by fine-grained row locking.

In embodiments, the page lock may be used as a "token of right" to grant row locks for any row stored in that page. A page lock may also be used as a "carrier" to distribute row lock information to a global (page) lock manager and other database masters. Page locks as used in embodiments described herein may also be referred to as "covering locks" that describes the formal relationship between a page lock and row locks of rows located within the page, as well as the rules that govern grantable row lock modes based on a "strength" of the covering page lock.

The use of embodiments may reduce or eliminate explicit row lock messages from being sent over a connecting network of the database. Row lock information may be piggybacked on top of existing page lock operation messages that are already required for protecting the physical consistency of a data pages and therefore no new, extraneous page locking network messages are introduced in the execution path of transactions. Protocol described herein also allow masters to grant compatible row locks concurrently and independently without requiring immediate synchronization amongst different masters and global lock managers while preserving the consistency of the database. This "lazy" (deferred) batching row locks synchronization scheme may further reduce the amount of network messages in the system.

According to an embodiment of the present disclosure, there is provided a method of managing locks in a database, to be performed by a row lock manager of a database master. The method includes receiving, from a transaction executing on the database master, a row lock request for a row in the database. The row lock request includes a page in the database where the row is located. The row lock request also includes a row lock mode of sufficient strength to perform the transaction. Then, sending, to a page lock manager, a request for a covering lock of the page. The request specifies a page lock mode of sufficient strength to satisfy the row lock mode. Also, receiving, from the page lock manager, a grant of the page lock. The page lock includes information on row locks of rows located in the page. Then, granting, to the transaction, the row lock.

In further embodiments, prior to the page lock manager granting the page lock to the row lock manager, the page lock manager reclaims, a second page lock for the page. The second page lock is held by a second database master in an incompatible mode. The page lock manager receives, from the second database master, a reply including second row lock information of rows located in the page. Also, the page lock manager merges the second row lock information into the page lock.

Further embodiments include, sending, by the row lock manager, to the page lock manager, a release of the page lock. The release of the page lock including local row lock information of rows located in the page where the local row lock information is local to the database master. Also, merging, by the page lock manager, the local row lock information into the page lock.

In further embodiment, the grant of the page lock includes row lock information of rows located in the page, and the method further includes updating, by the row lock manager, using the row lock information, local row lock information of the row lock manager.

Embodiments further include receiving, by the row lock manager, from a second transaction, a second row lock request for a second row located in the page. The second row lock request includes a second row lock mode of sufficient strength to perform the second transaction. Also, determining, by the row lock manager, that the page lock mode is sufficiently strong compared to the second row lock mode, and granting, by the row lock manager, to the second transaction, the grant of the second row lock.

In further embodiments, a row lock is granted only if the page lock mode is the same or stronger than the row lock mode.

In further embodiments, the page lock mode includes one of a shared page lock mode, a shared-exclusive page lock mode, and an exclusive page lock mode. Also, the row lock mode includes one of a shared row lock mode, and an exclusive row lock mode. The exclusive row lock mode is only granted when the page lock mode is the exclusive page lock mode. The shared row lock mode is granted when the page lock mode is one of the shared page lock mode, the shared-exclusive page lock mode, or the exclusive page lock mode.

Embodiments further include releasing, by the row lock manager, in response to the transaction terminating, the row lock, and sending, by the row lock manager, an ID of the transaction to the page lock manager indicating the release of the row lock. As well, the transaction ID may also be sent to other database masters in the database cluster.

In further embodiments, the page lock includes a page lock data structure. The page lock data structure includes a page ID, the page lock mode, and a row lock data structure. The row lock data structure includes an owner of the row lock.

In further embodiments, the page lock data structure further includes owner information and a page version number (PVN).

In further embodiments, the row lock data structure further includes a list of transaction waiters for the row lock and an offset.

According to an embodiment of the present disclosure, there is provided a row lock manager of a database master comprising a processor and a non-transitory memory for storing instructions that when executed by the processor cause the row lock manager to be configured to be operable to perform any of the methods as described herein.

According to an embodiment of the present disclosure, there is provided a computer readable medium for storing instructions that when executed by the processor of a row lock manager of a database manager, cause the row lock manager to be configured to be operable to perform any of the methods as described herein.

Embodiments have been described above in conjunctions with aspects of the present disclosure upon which they can be implemented. Those skilled in the art will appreciate that embodiments may be implemented in conjunction with the aspect with which they are described but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE DRAWINGS

FIG. 8 illustrates a table of page lock modes and row lock modes, according to an embodiment of the present disclosure.

FIG. 9 illustrates a table of page lock to row lock coverage and validity, according to an embodiment of the present disclosure.

It will be noted that throughout the appended drawings, like features are identified by like reference numerals.

DETAILED DESCRIPTION OF THE INVENTION

Figure 1:
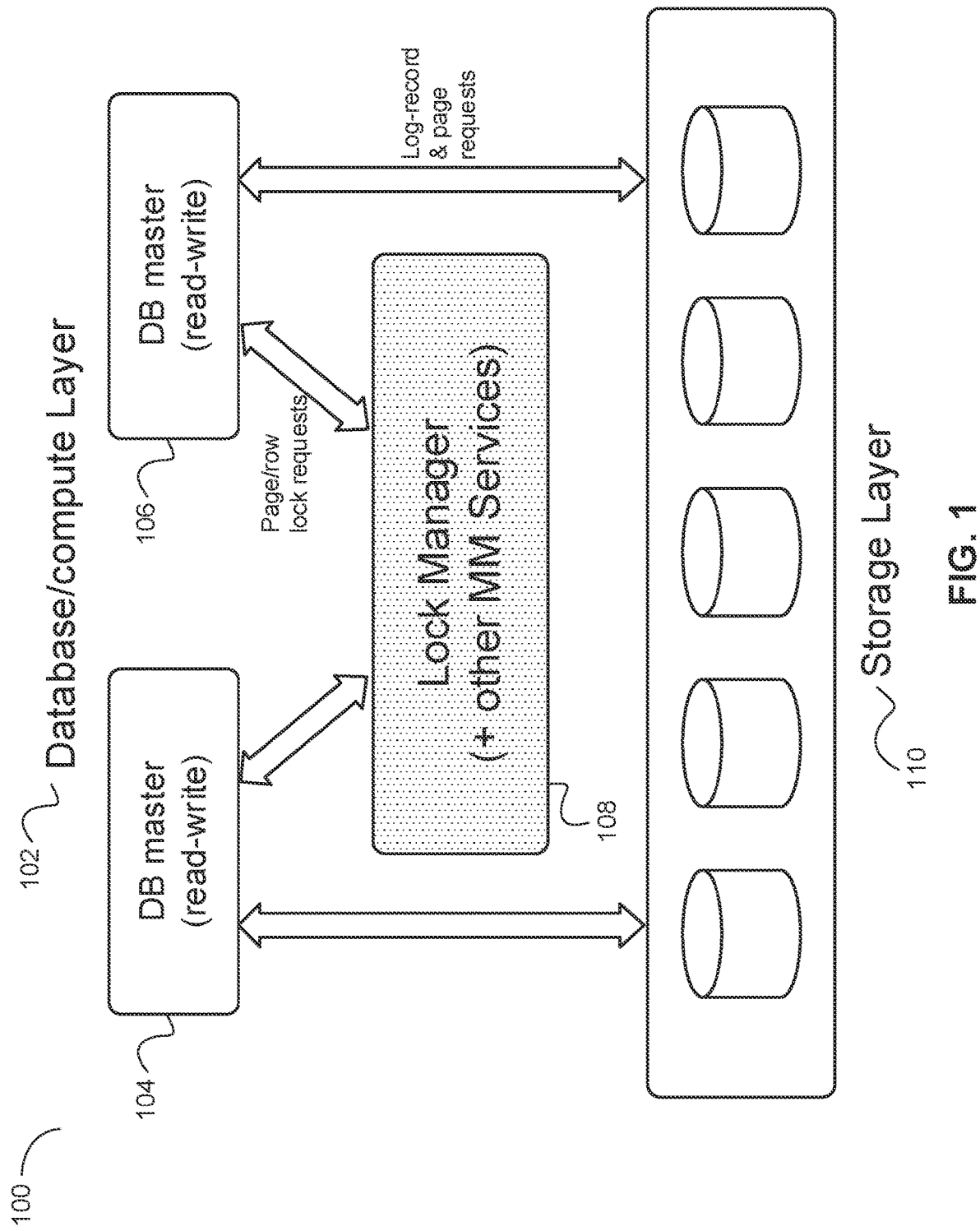
FIG. 1 illustrates a generic multi-master database architecture, according to an embodiment of the present disclosure.

Embodiments of the present disclosure generally provide for a method and apparatus for efficiently locking rows and managing row locks in a Multi-master (MM) database environment by reducing communications overhead and network traffic. Embodiments include a hierarchical, "hybrid" (combining physical page locks and logical row locks) locking protocol that satisfies correctness, performance, and scalability requirements for cloud based MM databases.

In a typical OLTP database, data is organized in relational tables with rows and columns. Table rows are stored in data pages. Logical ownership of a row is protected by its row lock and physical read/write access to the page (in memory) containing the row is protected by a physical page lock. To read or write a particular row in a page, a transaction needs to obtain the row lock for that row to declare its logical ownership of the row (in an appropriate lock mode) and also obtain the page lock for that page to read or write the underlying page in memory consistently. Both row locks and page locks may be requested with a lock mode appropriate to the read or write operations to be performed on the row and page. To provide concurrency to multiple active transactions while still preserving data correctness, rows in the same page can be locked by different transactions and the page can be accessed (read or written) by those active transactions in a well-defined, serialized order via the page lock.

In an MM architecture a page lock may have two parts: a local part and a global part. The local part of the page lock may be owned by a transaction, whereas the global part of the page lock may be owned by the master. However, in a single-master (SM) architecture, a page lock may only have a local part. As used herein, the term "held" is used to describe a database master being the owner of a page lock.

In embodiments, a page lock may be a physical lock (also commonly referred to as a "latch") as it protects the physical integrity of a page accessed by concurrent transactions. A page lock is held by a transaction for the read/write of the page and the page lock may be released afterward, even when the transaction is still active. A row lock is a logical lock as it controls access to a row by different active logical transactions. A row lock that is held by a transaction may be released when the transaction terminates. A page or row can be read by multiple transactions holding the same page or row lock in compatible lock modes. At any one time, a row can only be modified by a single active transaction and no other transaction can read that uncommitted row. The row lock prevents multiple transactions from updating the same row or reading uncommitted data, even if physical access to the page in memory can be serialized by the page lock. At any given time, a page can only be modified by the one transaction that holds the page lock with the appropriate mode. Each page change may be atomic and creates a new consistent version. For example, a transaction reading the page holding the page lock always reads the latest consistent version of the page.

Embodiments utilize locking components (e.g., page locks and row locks) to ensure not only system correctness (i.e., Atomicity, Consistency, Isolation, and Durability (ACID) properties) but also to improve performance and scalability. Locking is even more important in an MM database architecture with concurrent read/write transactions executing on different database masters in a cluster of servers or nodes. The lock manager or service needs to coordinate page and row locks for transactions distributed across different masters in a correct and performant fashion, but with the additional correctness complexity, and performance and scalability concerns present in an MM environment. Essentially, the locking component of an MM database is a complex distributed subsystem in and of itself.

In embodiments, the scheduling and arbitration of page locks and row locks in an MM database may done by an entity known as the global lock manager, which may also be referred to as a global lock service (GLS). Due to the distributed nature of database masters and lock manager, page and row locks requests in an MM database can generate large amounts of network messages and hinder overall system performance and scalability. Embodiments use for locking in MM databases may have the effect of reducing the pressure of network messages throughput (Input/output operations per second (IOPS)) and reducing transaction latency. The degree to which these system metrics may be improved depends on workload access patterns. Broadly speaking, an MM database can fall into one of these categories of application/workload access patterns; fully partitioned where each master access a disjoint set of tables, fully shared where all masters access the same set of tables, or mixed where some tables have partitioned access, and some have shared access. In real-world applications, workloads commonly exhibit mixed access patterns, which means there can be an excessive amount of network communications amongst nodes in the clusters (such as amongst database masters and MM service nodes) in production database systems in the cloud.

In embodiments, a database may serve many concurrent read/write transactions. A read/write transaction is commonly composed of multiple Data Manipulation Language (DML) statements (such as INSERT, UPDATE, DELETE) that manipulate table rows. Further, each such DML statement typically requires reading from and writing to multiple pages and rows that belong to the base tables, primary and secondary indices, system internal tables, etc. As noted, due to the distributed nature of database masters and lock manager in an MM environment, row lock operations from these statements can generate a great deal of network traffic in a heavy workload, causing bottlenecks or saturations on network IOPS and lengthening transaction execution latencies, and ultimately leading to poor performance and scalability of the overall system. These issues are exacerbated when masters access many of the same tables in a shared workload. Embodiments help to reduce the number of messages and their transfer rate and can free up CPU cores for more useful application-level work, such as processing more transactions or executing them faster. This has a positive impact on the throughput, performance (transaction latency), and scalability of the database system.

Locking and unlocking operations also add latencies to transaction execution time. In a typical cloud computing environment, a lock request roundtrip can take up to 100 μs. So, for a transaction that takes ~300 μs to complete (which is not uncommon for a OLTP workload), each additional lock request lengthens transaction execution time by ~30%. This is particular problematic to cloud databases because cloud networks in a datacenter is multi-tenanted and the cost of hardware is crucial to the business "bottom line" of a cloud services provider. Unlike an on-premise deployment, cloud providers generally cannot afford to have an isolated high-end, low-latency network for each. Embodiments help to optimize the performance and scalability of cloud-native MM databases through the use of a novel row locking protocol that can significantly reduce the amount of network traffic from row lock operations.

Embodiments provide methods directed to the locking of rows and the management of row locks in an MM database environment. In MM database systems, the storage of rows in a page as well as the access of those rows are intrinsically hierarchical. That is, a page must be locked in order to locate (search and match), read, and write a row stored within it. Furthermore, since a row must be located in a page before it can be locked, it implies the page lock must be held in a certain mode when the row lock is granted to a transaction. As well, the properties and relationship of physical (page) locks and logical (row) locks can be exploited in an MM architecture for the purpose of granting row locks. In particular, ownership of a physical page lock in an MM environment is at the database master level rather than at the transaction level, and so it can be obtained and released repeatedly during the lifecycle of a transaction without affecting ownerships of the logical locks granted to the transaction. Logical locks may continue to be held until the transaction terminates.

Embodiments may construct a hierarchical, "hybrid" locking protocol that encompasses physical page locks and logical row locks, that satisfies correctness, performance, and scalability requirements for cloud MM databases. Embodiments include a covering page lock held in a sufficiently strong mode by a database master and having sufficiently complete row lock information (for rows located in the covering page) available to the database master. It is also possible to exploit the properties of physical page locks to carry row lock information with it and distribute to masters for row lock scheduling and arbitration. A minimal amount of row lock information may be included in order to schedule and arbitrate row locks to reduce the network communications overhead when using fine-grained row locking. A page lock may be used as a "token of right" to grant row locks for any row stored in that page, and also as a "carrier" to distribute row lock information to a global lock manager and different database masters. That "covering lock" describes the relationship between page lock and row lock as well as the rules that govern grantable row lock modes based on a "strength" of the covering page lock. This protocol effectively eliminates explicit (i.e., separate) row lock messages from being sent over the database network. Row lock information may be piggybacked on existing page lock operation messages that are already required for protecting the physical consistency of a data pages and therefore it is possible to avoid extraneous page locking network messages that may be introduced during the execution of transactions. The protocol allows database masters to grant compatible row locks concurrently and independently without immediate synchronization amongst different masters or global lock managers, while preserving the consistency of the database. A "lazy" (i.e., deferred) batching row locks synchronization scheme may be used to further reduce the amount of network messages required by the system.

FIG. 1 illustrates a generic MM database architecture 100 that may be used to in embodiments. A database layer 102, which may also be referred to as a compute layer, includes a number of database (DB) masters such as DB master 104 and DB master 106, both of which may perform read or write operations. A lock manager 108 may be a logical entity that is implemented as a centralized component or a distributed component and may provide locking services and other multi-master (MM) services including the arbitration of page locks and row locks which can be done by the same lock manager or separately by different lock managers. A storage layer 110 allows for the persistent storage of the database. DB master 106 includes network connections to lock manager 108 and to storage layer 110 and may communicate page or row lock requests to the lock manager 108 and log-record or page requests to the storage layer 110.

Figure 2:
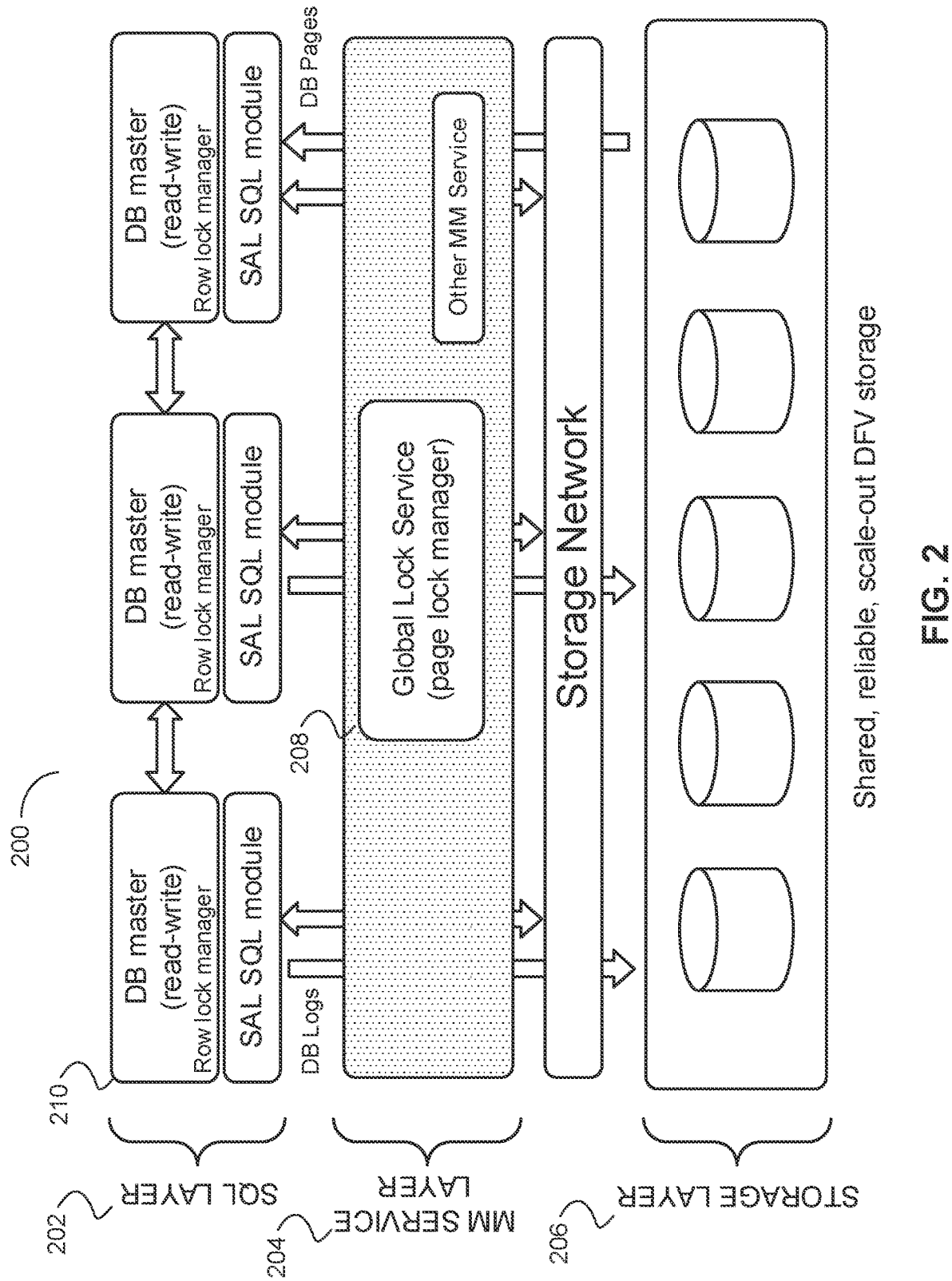
FIG. 2 illustrates a Multi-Master database architecture with a centralized page lock manager and distributed row lock managers, according to an embodiment of the present disclosure.

FIG. 2 illustrates an embodiment with an MM database cluster 200 architecture that includes a centralized global lock service and a distributed row lock manager. The database cluster 200 includes an SQL layer 202, an MM service layer 204, and a storage layer 206. The SQL layer provides computing services for database transactions and includes a number of DB master 210 compute nodes. Each DB master computes read/write operations and includes its portion of the distributed row lock manager and a Storage Abstraction Layer (SAL) SQL module which may to allow different database or SQL layers (e.g., MySQL, PostgreSQL, etc.) to interact with the same MM service and storage layers. The MM service layer 204 includes a Global lock service (GLS) 208 (which may also be referred to as a page lock manager) which schedules and arbitrates page lock requests from different DB masters in the database cluster 200. The GLS 208 may also stores row locks alongside their associated covering page locks. However, the GLS 208 is agnostic to row lock scheduling and arbitration, which are performed by row lock managers (RLM) on each database master. Hence, the GLS 208 may also serve as a "hub" which merges, caches, and distributes row lock information to DB masters 210.

Figure 7:
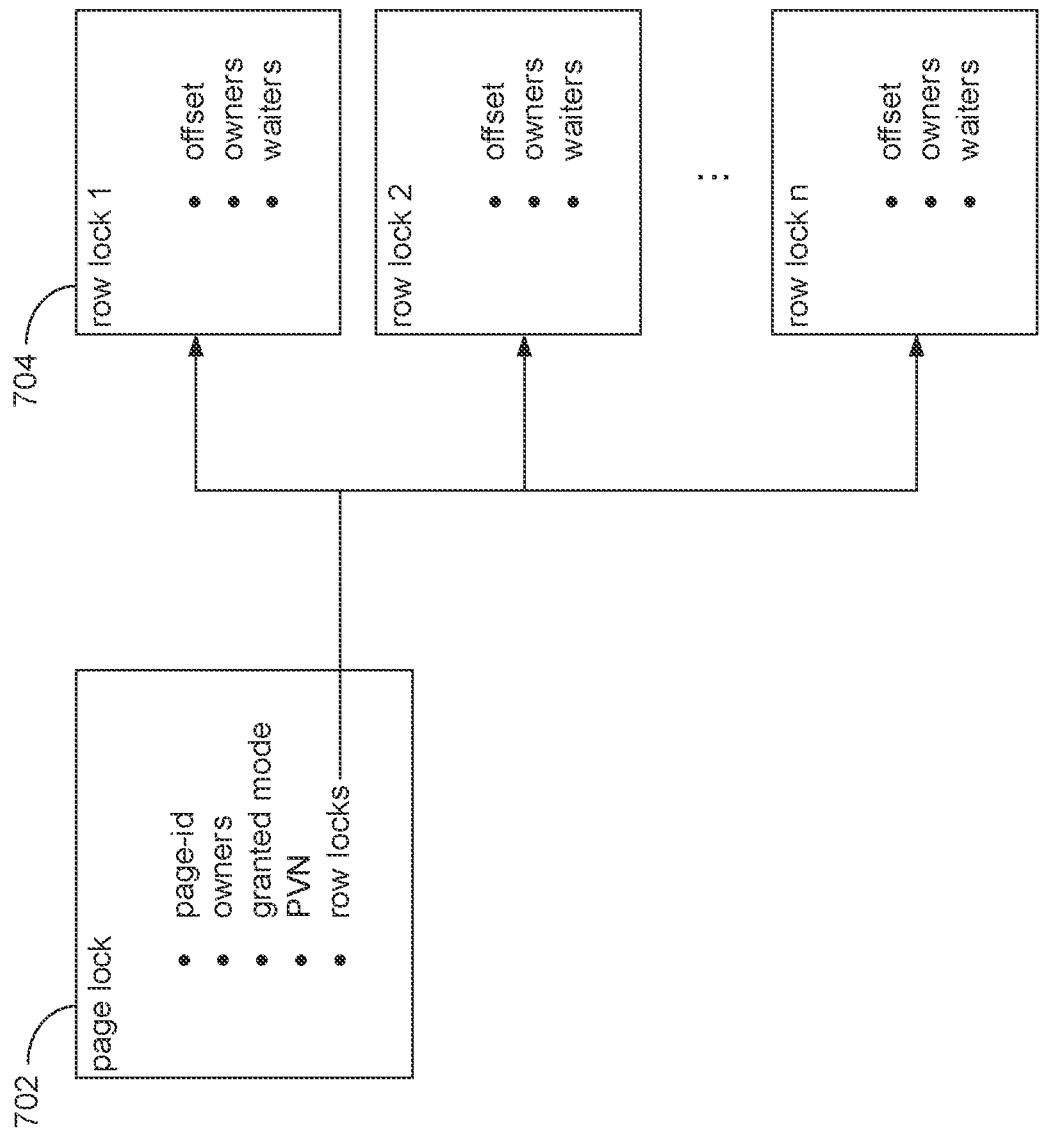
FIG. 7 illustrates a data structure of a page lock with included row lock information, according to an embodiment of the present disclosure

In embodiment, page locks and row lock information may be represented by data structures as illustrated in FIG. 7. A page lock 702 data structure may include several data elements such as page-id, owners, granted mode(s), page version number (PVN), and row locks.

page lock: [page-id, owners, granted mode, PVN, row locks]

Page-id may be a unique page identifier. Owners may be an ID of one or more database masters which own the lock in compatible lock modes.

Granted mode may be one or more compatible lock modes granted to each of the lock owners. Since different owners of the page lock can be holding different but compatible lock modes multiple granted modes may be required to represent the lock granted to each lock owner.

PVN may represent a version of a page with different PVNs (versions) representing a change in the contents of a page. In embodiments, a higher PVN represents a newer version of a page.

Row locks may be zero or blank, or contain a list of row lock 704 data structures that are covered by the page lock. A row lock data structure included in the page lock data structure may contain the following information and be used in network messages.

row lock: [offset, owners, waiters]

The data elements of the row lock 704 data structure include an offset, a list of owners, and a list of waiters. Offset may be a location of the row within the page. The offset changes if the row is moved to a different location within the same page or a different page (e.g., from a page-split operation resulted from a row insert). The offset allows for the identification of a specific row within the covering page. Each row within the page may have a unique offset, and this is how a database master may determine if a particular row in the page has been locked or being waited on. The offset may also be referred to as a "row ID." Some system implementations require an explicit row ID be included in the row lock information, which may serve as a logical ID that is not affected by row offset changes and allows row lock ownership to be preserved from row movements across pages (e.g., due to a page-split). However, other system implementations may not require an explicit row ID. Note there is no need to store the page-id in the row lock since it follows the covering page lock and the page-id is stored at the page lock level. Owners may be a list of transactions in the cluster 200 that own the row lock in a compatible mode. A row lock owner is represented by a transaction-id (unique across the cluster 200) and the mode (e.g., shared, or exclusive) in which the lock is granted. Waiters may be a list of transactions in the cluster 200 that are waiting for the row lock in a mode that conflicts with the current granted modes. A row lock waiter may be represented by a transaction-id and the requested lock mode. This list can be ordered (such as in arrival order) based on the desired lock scheduling policy.

Embodiments include a number of methods to implement the protocols described herein. In an embodiment, when a page lock manger 208 (i.e., a GLS) grants a page lock to a requestor database master 210, it may also send the latest page version number (PVN) and all the row locks covered by the page lock to the requestor database master 210. The row locks from the received page lock may then be added or merged with the database master's 210 row locks states via its row lock manager. While holding the covering page lock, the database master 210 can then grant compatible row locks to local transactions without communicating with the page lock manager 208 or other database masters and its local row lock states may be updated to reflect row lock arbitration decisions. When the requestor database master 210 releases the page lock, either voluntarily or through page lock manager 208 lock-reclaim, it sends the latest PVN and all the covered row locks back to page lock manager 208. The page lock manager 208 may merge and store the received row locks with the existing row locks information. The updated information may then be passed to the next page lock owner.

FIG. 8 provides a table illustrating the compatibility of different lock modes. In embodiments, the supported page lock modes may be Shared (S), Shared-Exclusive (SX), and Exclusive (X). As well, the supported row lock modes may be Shared (S), and Exclusive (X). Lock modes may be viewed as having a "strength," with exclusive being the stronger mode, shared being the weakest (least strong mode), and shared-exclusive being of medium strength. Therefore, the exclusive mode is stronger than the shared-exclusive mode, and the shared-exclusive mode is stronger than the shared mode. In other embodiments, page lock modes and row lock modes may be different from the above. The different lock modes allows the system to increase lock concurrency for different transactions while preserving data consistency. A lock may be not held at all, i.e., there is no lock presently held. A lock may be in shared mode, allowing multiple concurrent readers. A lock may be in a shared-exclusive mode which allows a single-writer and multiple concurrent readers. A common usage of this mode is to allow one thread to update part of a shared object (e.g., header) while other threads can read the stable parts of the same object (e.g., payload). A lock may also be in exclusive mode with allows only a single writer. FIG. 8 illustrates whether a lock may be requested in a requested mode 804 depend on the presently held mode 802. If a lock is not held, any new request may be allowed irrespective of the requested mode. If a lock is held in shared mode, then a new request may be allowed if the requested mode is shared or shared-exclusive but must wait if the requested mode is exclusive. If a lock is held in shared-exclusive mode, then a new request may be allowed if the requested mode is shared but must wait if the requested mode is shared-exclusive or exclusive. If a lock is held in exclusive mode, any new request must wait irrespective of the requested mode.

In embodiments, combinations a row lock modes 902 and page lock modes 904 may be valid or invalid. A row may be stored in only one page and a page lock for that page may be referred to as the covering page lock for the row and its row lock. Hence a page lock covers row locks for all the rows stored in the page. To check if a row lock can be granted, the covering page lock must be held, and the latest row locks information must be refreshed first. FIG. 9 illustrates if it is valid or invalid to grant a row lock in a particular row lock mode while holding the covering page lock in a page lock mode. In general, a row lock mode can be granted up to the strongest lock mode held by page lock. For example, a row lock can only be granted in exclusive mode if the page lock is held in exclusive mode. A row lock can only be granted in shared mode while the page lock is held in any one of shared, shared-exclusive, or exclusive mode.

In embodiments, the rules illustrated in FIG. 9 allow a database master to send row locks information to a page lock manager only when the master releases the covering global page lock (either voluntarily or reclaimed by the page lock manager), but not every time a row lock is granted as this would be prohibitively expensive from a network communication perspective. Note that to release a row lock, the transaction (or more precisely the database master where the transaction is running) does not need to be holding the covering page lock. The page lock is needed only for granting row locks and reading or writing the page contents. The protocol design ensures that data consistency may be preserved while promoting lock concurrency. Since only one transaction on one master can be holding a covering page lock in exclusive mode at any given time, only one transaction across the cluster 200 can be granted a row lock in exclusive mode. On the other hand, multiple masters can be holding a covering page lock in shared mode, and multiple concurrent transactions in the cluster 200 can be granted a row lock in shared mode.

In embodiments, after a transaction attempts to obtain a row lock, it can release the page lock regardless of whether the row lock is granted successfully if not. If the row lock is granted, the new row lock owner is updated. If the row lock cannot be granted immediately, the row lock waiter information is updated. The updated row lock information will be carried by the page lock when it is released or reclaim by GLS. Depending on specific workload patterns (for example; partitioned vs shared) and the locking policy used, the transaction may not necessarily release the page lock immediately after use. Optionally, the transaction may allow the page lock to be reclaimed immediately, for example, if another database master wants or required the page lock.

As mentioned, a page lock is a physical lock whose ownership is at the database master-level. Hence, after a covering page lock is granted to a database master, the database master can locally schedule and arbitrate row locks requests via its row lock manager without notifying the global page lock manager for the whole duration it is holding the page lock. This can eliminate all explicit row lock operation network messages to the global row lock manager. This locking protocol is hierarchical with two levels and allows fine-grained concurrency control of data rows.

In embodiments, a page lock manager 208 may relay sufficiently complete row lock information to database masters to allow multiple masters to perform row lock arbitration concurrently and independently. "Sufficiently complete" row lock information refers to the notion that a page lock contains sufficient but not necessarily complete information, from a cluster-wide, or global point of view, for a master to perform row lock arbitration without breaking correctness or data consistency in the system. More specifically, a covering page lock will carry sufficient row lock information to allow a lock manager to block conflicting row lock requests if required. It is not required to carry all the information from non-conflicting row lock requests. In other words, if a transaction attempts to grant a row lock in exclusive mode, since exclusive mode is not compatible with any lock mode, the covering page lock will include sufficient information about all the row lock owners and their modes in the cluster 200 (including remote transactions). However, when a transaction attempts to grant a row lock in shared mode, the covering page lock is required to have sufficient information about the exclusive lock holder (and exclusive mode waiters as well, if a starvation-free locking policy is used) but not necessarily information for all the shared mode lock holders in the cluster 200. This allows the protocol to reduce row lock synchronization overhead and network communications between database masters and page lock mangers.

The hybrid locking protocol may include several components: Row locks distribution and synchronization, row locks processing (including updating & merging), row locks waiting and granting, row locks relocation, and row locks cleanup.

Figure 3:
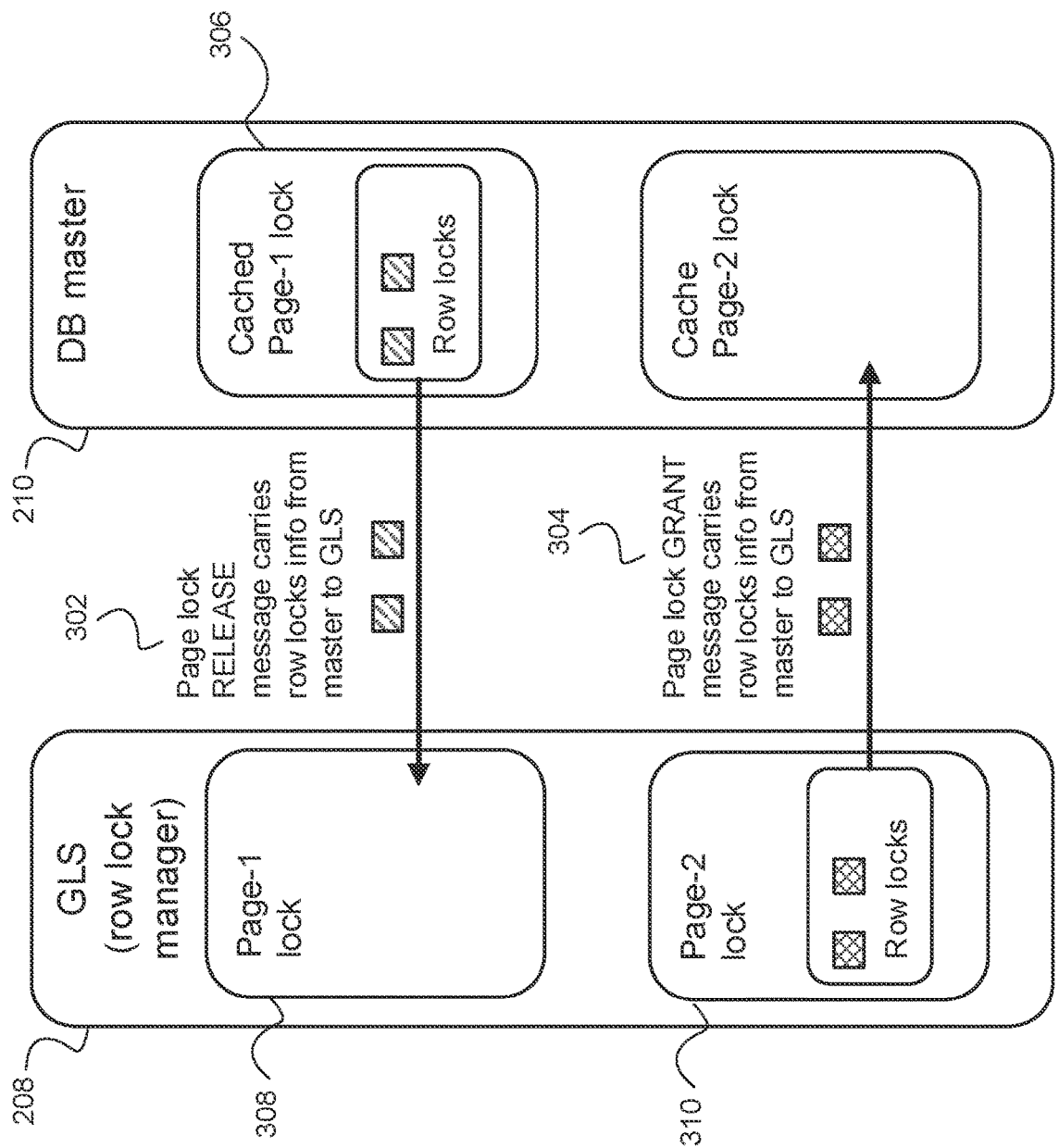
FIG. 3 illustrate an overview of a row lock information distribution method, according to an embodiment of the present disclosure.

FIG. 3 illustrates row lock information distribution which may be included in a hybrid locking protocol in accordance with an embodiment. Without jeopardizing data consistency of the database, row lock owners and waiters on a database master do not need to be synchronized with other database masters immediately. Rather, synchronization can be done on-demand or "lazily" when the covering page lock is requested by another database master. This approach uses a page lock release/reclaim flow to send row locks to the page lock manager 208 (the GLS) and avoids informing the page lock manager 208 on every row lock grant or wait. This can significantly reduce the amount of row locking network traffic and is scalable from a network IOPS (number of messages) perspective. With reference to FIG. 3, on a database master 210, releasing a page lock 306, the covered row locks on the page may be sent to the page lock manager 208 in a RELEASE message 302. The page lock manager 208 may use the received information to update and merge row lock information that may be cached in memory alongside with the covering page lock 308. For the database master 210 to grant a row lock requires acquiring its covering page lock 310, which carries a sufficiently complete set of row locks, communicated in a GRANT message 304, to allow the database master 210 to make row locking decisions.

Embodiments include protocols to implement row lock processing. When a page lock manger 208 processes a page lock request, the page lock manger 208 checks to verify if the lock can be granted according to lock modes compatibility illustrated in FIG. 8. If the lock cannot be granted immediately, the page lock manger 208 sends a lock-reclaim request to the database master(s) 210 holding the lock in conflicting modes. For example, if shared-exclusive mode is requested by a first database master and the lock is held in shared-exclusive mode by a second database master and in shared mode by a third database master, then the page lock manger 208 sends a lock-reclaim request only to the second database master.

When a database master 210 receives a lock-reclaim request, database master 210 may first wait for all transactions that are using the page lock (or waiting on it, depending on locking policy) to finish using the lock (but there is no need to wait for the transaction to end). Then all the row locks that are covered by the page lock are sent back to the page lock manger 208 in a lock-reclaim acknowledgement (ACK) message.

When the page lock manger 208 receives a page lock release or reclaim-acknowledgment message from a database master 210, it processes the attached row locks. The page lock manger 208 keeps track of terminated remote transactions. For a received row lock during page lock reclaim or release, if the owning transaction has terminated already then, the page lock manger 208 may simply discard the row lock without further processing. This may be possible due to timing such that the transaction terminates while the lock reclaim ACK to the page lock manger 208 was still in-flight.

For each row lock owner received, the page lock manger 208 may add to its set of row lock owners if the list does not already exist. Then, for a row lock owner that exists in the page lock manger 208 (for that page lock) but no longer appears in the page lock reclaim/release message, the page lock manger 208 may remove it from its set of cached row locks, since that means either the owning transaction has ended or the row (thus the row lock too) has been moved to a different page. If the reason is due to a terminated transaction, proper row locks cleanup for the transaction will occur when the page lock manger 208 receives the transaction termination message.

When a database master's 210 lock request is granted, the database master 210 processes the row locks that are attached to the lock-grant message from the page lock manger 208. A database master 210 also keeps track of terminated remote transactions. For a received row lock, if the owning transaction, either local or remote, has terminated already then, the database master 210 may simply discard the row lock without further processing. This may be possible due to timing such that the page lock manger 208 may not have been notified about the termination of those transactions yet at the time the page lock manger 208 sent out the lock-grant message.

For row locks owned by active or remote transactions, if they exist on both the database master 210 and the page lock grant message from the page lock manger 208, no additional processing is necessary, otherwise there may be a need to consider whether the database master 210 is requesting a new page lock or upgrading an existing page lock to a stronger mode (e.g., from shared to shared-exclusive, or from shared-exclusive to exclusive).

Embodiments include protocols for requesting a new page lock. A database master 210 may currently not be holding the page lock so its row locks information for both local and remote transactions could be outdated or incomplete. That is, the page lock manger 208 may have more up-to-date information for row locks modified by remote transactions. So for a row lock owned by an active transaction that exists in the page lock grant message but not on the database master 210, it is added to the database master's 210 set of row locks, since that means it is either a new row lock granted by a remote database master (for a remote transaction) or it is a previously granted row lock that has been migrated to another page as part of a page-split or page-merge (for a local or remote transaction) that occurred on another database master. Conversely, for a row lock owned by an active transaction that exists on the database master 210 but does not appear in the page lock grant message, the row lock may be removed from the database master's 210 set of row locks, since that means the row lock has been released by a terminated remote transaction or it is a previously granted row lock that has been migrated to another page as part of a page-split or page-merge (for a local or remote transaction) that occurred on another database master. These scenarios are possible because the database master 210 is not holding the page lock and so row migration by a remote database master can happen. Information about the migrated rows and their row locks will be obtained when their new covering page locks are granted, which must be done before the locked rows can be accessed again.

Embodiments include protocols for upgrading an existing owned page lock. When compared to protocols for requesting a new page lock as described herein, in the page lock upgrade case, row (and row lock) migration from a remote transaction is not possible, since the operation requires a page lock in exclusive mode on both the source and destination pages. Furthermore, since the database master 210 is already holding an existing page lock (in shared or shared-exclusive mode), it means new row locks in shared mode could have been granted to local transactions and page lock manager 208 is not aware of them yet (since the database master 210 has not released the page lock yet). For a row lock owned by an active transaction that exists in the page lock grant message but not on the database master 210, it is added to the database master's 210 set of row locks, since that means it is a new row lock granted by a remote database master for a remote transaction (which is not possible for a local transaction). Conversely, for a row lock owned by an active transaction that exists on the database master 210 but does not appear in the page lock grant message, if the transaction is remote the row lock is removed from the database master's 210 set of row locks, since that means that the row lock have been released by a terminated remote transaction. However, if the transaction is local the row lock is preserved.

Embodiments include protocols dealing with row lock granting and waiting (on database masters 210). As noted, row locks may be arbitrated and scheduled by the distributed row lock manager, located with database masters 210, and not by the page lock master 208. When a transaction terminates it releases all its row locks. If other transactions are waiting for a released row lock one of those other transactions is chosen to be the next lock owner. Recall that to grant a row lock the covering page lock must be held. One approach is to immediately acquire the covering page lock for each row lock that needs to be granted, but it is inefficient as it would generate a lot of network round trip traffic with the page lock master 208. In embodiments, when a database master 210 is notified about a transaction termination, the database master's 210 row lock manager or scheduler may examine the row locks that are released by the transaction. For a local transaction that is waiting on a row lock, the row lock manager may wake it up from a suspended or wait state if the row lock manager determines that it is the transaction's turn to get the row lock, according to the lock waiter information and a given scheduling policy (e.g., "first-come-first-serve"). At that point, if the database master 210 is holding the covering page lock the row lock may be granted to the transaction immediately, otherwise the row lock may be marked as "grant-pending" until the covering page lock is re-obtained. The transaction does not need to immediately request the covering page lock and may continue its execution. At some point the transaction may read or write the row and it would need the page lock for the operation. Since granting a row lock requires its covering page lock and row lock waiters are piggybacked on the page lock, the row lock waiters' information may be synchronized via the page lock and all database masters that want to grant the incompatible row lock modes are forcibly serialized via the page lock at that point. Thus, database masters see the same row lock waiters' information and would not grant conflicting row locks. Once the page lock is re-acquired, the transaction may confirm that no other transaction is holding the row lock and covert the row lock from the grant-pending state to the granted state. If the row lock has been granted to another transaction or the transaction now requires a stronger and incompatible row lock mode, the transaction may update the row lock waiter information, reset the grant-pending state, and then go into wait state and retry the operation when it is woken up again. At that point the covering page lock can be reclaimed by page lock manager 208. Therefore, the protocol avoids adding extra page lock requests in the flow just to grant row locks for a waiting transaction.

Embodiments include protocols for dealing with row lock relocation, for example for row lock synchronization in the case of page split or page merge scenarios that result from database queries such as INSERT, UPDATE, or DELETE. This will be illustrated with reference to FIG. 4 and using the example of a typical database B-tree index structure implementation where a row can be moved to a new page due to an operation such as page-split or a page-merge. A page-split can occur during a row insert or update when the target page does not have sufficient space. A new page is created and rows from the existing page are moved to the new page. In contrast, a page-merge can occur during a row delete when the size of the target page falls below a certain threshold. Rows from the target page are moved to another existing page with sufficient space for the rows. The target page is then deleted from the B-tree and its space is reclaimed. A row can also be relocated within the same page to reduce internal space fragmentation in that page. In all these row relocation scenarios, the moved rows may have been locked by local or remote transactions, so those row locks need to be relocated as well. To move the rows and their locks, both the source and destination pages must be locked in exclusive mode. Furthermore, after the move the pages involved must have larger PVNs (i.e., be newer versions of the page). Note that the "mover" transaction does not need to request row locks to move the rows since row relocation is a physical operation, not logical. That is, even though rows and their locks are physically moved to another page, logical ownership (transactions) of those row locks may remain unchanged.

Figure 4:
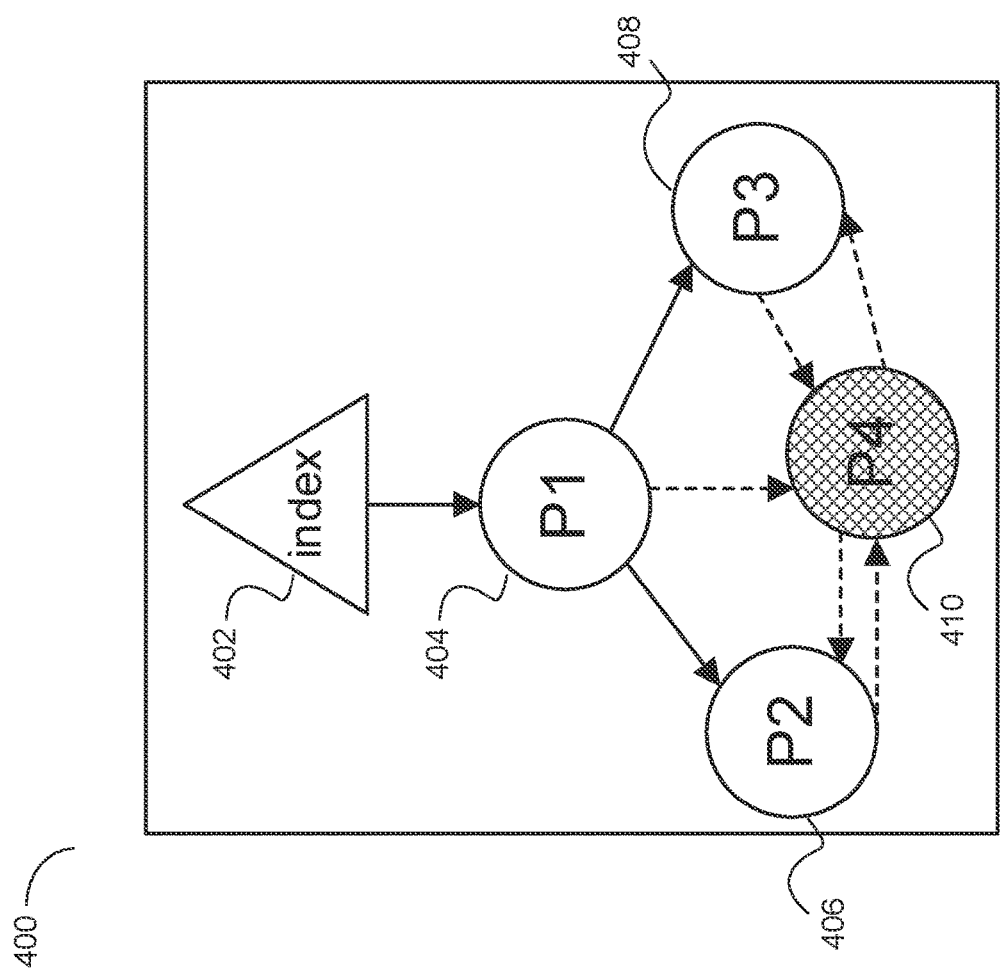
FIG. 4 illustrates an exemplary method of page-splitting in a B-tree, according to an embodiment of the present disclosure.

FIG. 4 illustrates an example of a page-split in a B-tree 400 as may occur in embodiments. FIG. 4 shows a page-split scenario with a simple B-tree index structure. Page P1 (shown as 404) is a root page. Pages P2 and P3 (shown as 406 and 408 respectively) are existing leaf pages of page P1. Page P4 (shown as 410) is a new leaf page to be added to the B-tree 400. Index structure 402 provides information on the B-tree structure. In this example, a transaction, T1, attempts to insert a new row in page P2 but the page does not have sufficient space. So T1 allocates a new page, P4, and moves some rows and the corresponding row locks from P2 to P4. After relocating the rows and row locks, T1 updates the index structure 402 to reflect P4 as a new leaf node (i.e., updates the links of P1, P2, P3 to point to P4) and inserts the new row in the appropriate leaf page.

The implication of relocating row locks to a new page is that the row lock information cached in other database masters 210 or page lock manager 208 has become outdated and needs to be refreshed. However, it does not need to be done immediately. Rather, it can be done using an on-demand or lazily basis as part of regular page lock release (to update page lock manager's 208 cache) and acquire (to update a master's cache). These methods of refreshing page lock information helps reduce the amount of locking network messages in the database. Cluster 200.

In embodiments, a page-split operation may start when a transaction, T1 on database master, M1, updates a row, R1, on page P2. The database master M1 acquires a page exclusive-lock on page P2, and a row exclusive-lock covered by the page lock. The page lock obtained by database master M1 in exclusive mode may be denoted as [P2-M1-X] (i.e., a lock on page P2, by database master M1, in exclusive mode [X]), and row exclusive lock by transaction T1 as [P2-R1-T1-X] (i.e., a lock on row R1 located in page P2, by transaction T1, in exclusive mode [X]). When a second transaction T2 executing on database master M2 wants to update row R2 on P2. It requests an exclusive lock on page P2 from page lock manager 208. Upon receipt of M2's request, page lock manager 208 reclaims [P2-M1-X] from M1. M1 releases [P2-M1-X] (after local transactions are done with the page lock) and sends the row lock [P2-R1-T1-X] to page lock manager 208 in the page lock reclaim acknowledgement (ACK) message. Page lock manager 208 may then grant a page exclusive-lock to M2, denoted as [P2-M2-X], and forwards the row lock [P2-R1-T1-X] to M2 in the covering page lock grant message. M2 updates its local row lock manager with [P2-R1-T1-X]. T2 on M2 may then acquires a row exclusive-lock on another row R2 on P2, denoted as [P2-R2-T2-X].

At this point, the MM system states are as follows:

M1:
    Page locks: none
    Row locks: [P2-R1-T1-X]

M1 does not own any page lock. It is aware of local row lock [P2-R1-T1-X] but not the remote row lock [P2-R2-T2-X].

M2:
Page locks: [P2-M2-X]
Row locks: [P2-R1-T1-X] and [P2-R2-T2-X]
M2 owns page lock [P2-M2-X]. It is aware of both the remote and local row locks.

Page lock manager 208:
Page locks: [P2-M2-X]
Row locks: [P2-R1-T1-X]
Page lock manager 208 is aware of the page exclusive lock held by M2 and [P2-R1-T1-X] is cached, but [P2-R2-T2-X] is not cached because the page lock is not released or reclaimed yet.

Now suppose transaction T1 wants to insert a new row R3 on page P2 but the operation requires a page-split as there may be insufficient space on page P2 to accommodate row R3. Transaction T1 first requests an exclusive lock on P2, causing page lock manager 208 to reclaim [P2-M2-X] from M2. M2 releases the page lock (after its local transactions are done with it) and informs page lock manager 208 about the row locks [P2-R1-T1-X] and [P2-R2-T2-X]. Page lock manager 208 grants P2 an exclusive lock to M1 and forwards the two row locks to the master. M1 adds the remote lock [P2-R2-T2-X] to its local row lock manager. The local row lock [P2-R1-T1-X] already exists on M1. T1 splits P2, creates a new page P4, and moves both rows to P4. Consequently, row locks for R1 and R2 are moved in M1's row lock manager as well:

[P2-R1-T1-X]→[P4-R1-T1-X]
[P2-R2-T2-X]→[P4-R2-T2-X]

These row movements have created new versions of P2 and P4 with increased PVNs.

T1 updates the index tree structure 402 to include P4. Then, T1 is granted row lock [P4-R3-T1-X] and inserts R3 in P4.

As a result of the page-split and row movements, the row locks cached in page lock manager 208 and database master M2 have become stale and will be refreshed, which happens eventually (lazily) when the page locks for P2 and P4 are reclaimed from M1 and granted to database master M2 via page lock manager 208. Although M2's cached row locks are outdated (before the refresh), it would not cause any correctness issue because M2 is not holding those covering page locks and as such it cannot grant new row locks on either page nor can it perform read or write operations on those pages. Logical ownership of row locks granted to T1 and T2 are also not affected. Since reads and writes of the moved rows require the corresponding covering page locks, before T2 can read or update R2 during its execution, it needs to re-acquire the covering page lock first. Even though M2's row lock information is stale and T2 thinks R2 is still located in P2, when M2 re-acquires [P2-M2-X], it would find out from page lock manager 208 (who got the updated row locks from M1) that its cached page P2 is stale and the row lock [P2-R2-T2-X] no longer exists in P2's page lock. At that point M2 would remove [P2-R2-T2-X] and [P2-R1-T1-X] from its local row lock manager. Further, since R2 is no longer in P2, T2 needs to traverse the index B-tree from its root node to locate R2 again and finds it in P4 now. So, T2 requests P4's page lock. Page lock manager 208 reclaims [P4-M1-X] from M1 and receives the moved row locks [P4-R1-T1-X] and [P4-R2-T2-X] as well as the new row lock [P4-R3-T1-X]. Page lock manager 208 grants [P4-M2-X] to M2 and sends it the moved row locks. M2 updates its row lock manager with the received row locks. Hence T2 knows it still has R2 locked in exclusive mode and can proceed to read and update the row.

If T2 now wants to update row R3. M2 is still holding the covering page lock P4 so it tries to grant the R3's exclusive lock to T2. However, from its row lock manager database master M2 discovers that the remote transaction T1 has R3 locked in exclusive mode and the row lock cannot be granted to T2 immediately. T2's execution is suspended until T1 terminates and releases [P4-R3-T1-X], at which time the row lock can be granted to T2, and it resumes execution.

Note that page lock manager's 208 page lock grant message carries with it the latest PVN for the page, which allows the page lock requestor (a database master) to determine if its cached version of the page is stale or not. If the page is found to be stale, the transaction must refresh the page (e.g., from the storage layer) before it is permitted to read or write its contents.

In embodiments, the flow of steps to implement a page-merge operation is similar to that of a page-split operation as described herein.

In embodiments, a cleanup of row lock may occur on a database master 210 and on a page lock manager 208. When a transaction terminates, it may release all its row locks. As describe herein, with this protocol row locks owned by the terminating transaction can be cached in other database masters 210 and in a page lock manager 208. The protocol ensures these stale copies of the row locks are deleted eventually. To reduce network messages, when a transaction terminates, it does not notify the page lock manager 208 immediately to delete its row locks; rather, each database master 210 periodically (e.g., every second) sends a batch of terminated local transaction IDs to the page lock manager 208 to perform garbage collection on their cached row locks. Note that tracking terminated transactions on the page lock manager 208 is an optimization to help reduce sending unnecessary row locks to database masters 210. It may not be needed for functional correctness of the system as a database master 210 has logic to filter out row locks from terminated transactions itself. The cleanup of the stale copies of row locks on a database master 210 may use the same mechanism as a database read replica's transaction handling as may be used in a single-master architecture. When a write transaction ends (through a commit operation or a rollback operation) on a database master 210, a commit record is written to a commit log where it may be read by remote masters. After a remote master reads and parses the commit log record, it determines what row locks were held by the terminated transaction and deletes those locks from its local row lock manager. A master may also track if a transaction has synchronized its row locks with the page lock manager 208, in order to avoid sending unnecessary transaction termination notifications to the page lock manager 208. Specifically, if a transaction has sent row locks that it owns to the page lock manager 208 (e.g., during a page lock release or a reclaim), at transaction end time the database master 210 may add the transaction ID to the batch of ended transactions which gets sent to the page lock manager 208 periodically for row locks garbage collection. Otherwise, there is no need to notify the page lock manager 208 about the transaction termination. This further reduces unnecessary row locks cleanup network messages to the page lock manager 208.

In embodiments, shared row locks may be managed in order to reduce the number of network messages communicated between database masters 210 and a page lock manager 208. To reduce network messages with the page lock manager 208 and other database masters 210, protocols may allow multiple masters to independently grant shared row locks while holding the covering page lock in compatible modes without immediate synchronization. Since each of those database masters 210 can grant locks in shared mode for different rows, each database master's view of the row's shared lock owners could be different and incomplete from a global cluster-wide point of view until they are merged by the page lock manager 208 and re-distributed to database masters with new page lock requests. Even though there is a time window in which knowledge about all shared row lock owners are distributed across the cluster, with each database master and with the page lock manager 208 potentially possessing only partial knowledge about all the shared row locks in the cluster, it would not pose any data correctness or consistency danger. Since shared and exclusive are incompatible lock modes, when a database master grants a row lock in shared mode while holding the covering page lock in shared mode, it can be certain that no other database master can possibly be holding the same page lock in exclusive mode. Moreover, as a consequence of the protocol rule that a row lock in exclusive mode can only be granted while holding the covering page lock in exclusive mode, the database master can also be certain that no other transaction in the cluster 200 can possibly have been granted an exclusive lock to the same row. From the point of view of a local transaction holding the row lock in shared mode, the only possibilities are:

1. No other transaction is holding the same row lock in exclusive mode.
2. One or more other transactions are holding the same row lock in shared mode.

Neither possible outcome would impact the correctness or consistency of reading the row by the local transaction since the row cannot be modified. When another transaction wants to grant a row lock in exclusive mode on that page, it needs to first acquire (or upgrade) the covering page lock in exclusive mode, which would cause the page lock manager 208 to trigger a reclaim on all the page lock owners and force a synchronization of all row locks held on that page on different database masters. The page lock manager 208 would merge all the received row locks into a global complete view and forwards it to the requesting database master for granting row exclusive locks correctly. Therefore, the protocol has a well-defined synchronization point for granting row exclusive locks to guarantee data consistency. Essentially, the protocol allows the merging and synchronization of the distributed knowledge for all shared row locks to be deferred until a transaction (on any database master) decides to lock a row on that page in exclusive mode (or more generally any mode that conflicts with shared mode). Since many real world workloads are read-heavy, this design benefits an MM database with reduction in row locks synchronization network traffic, even on shared workloads.

Figure 5:
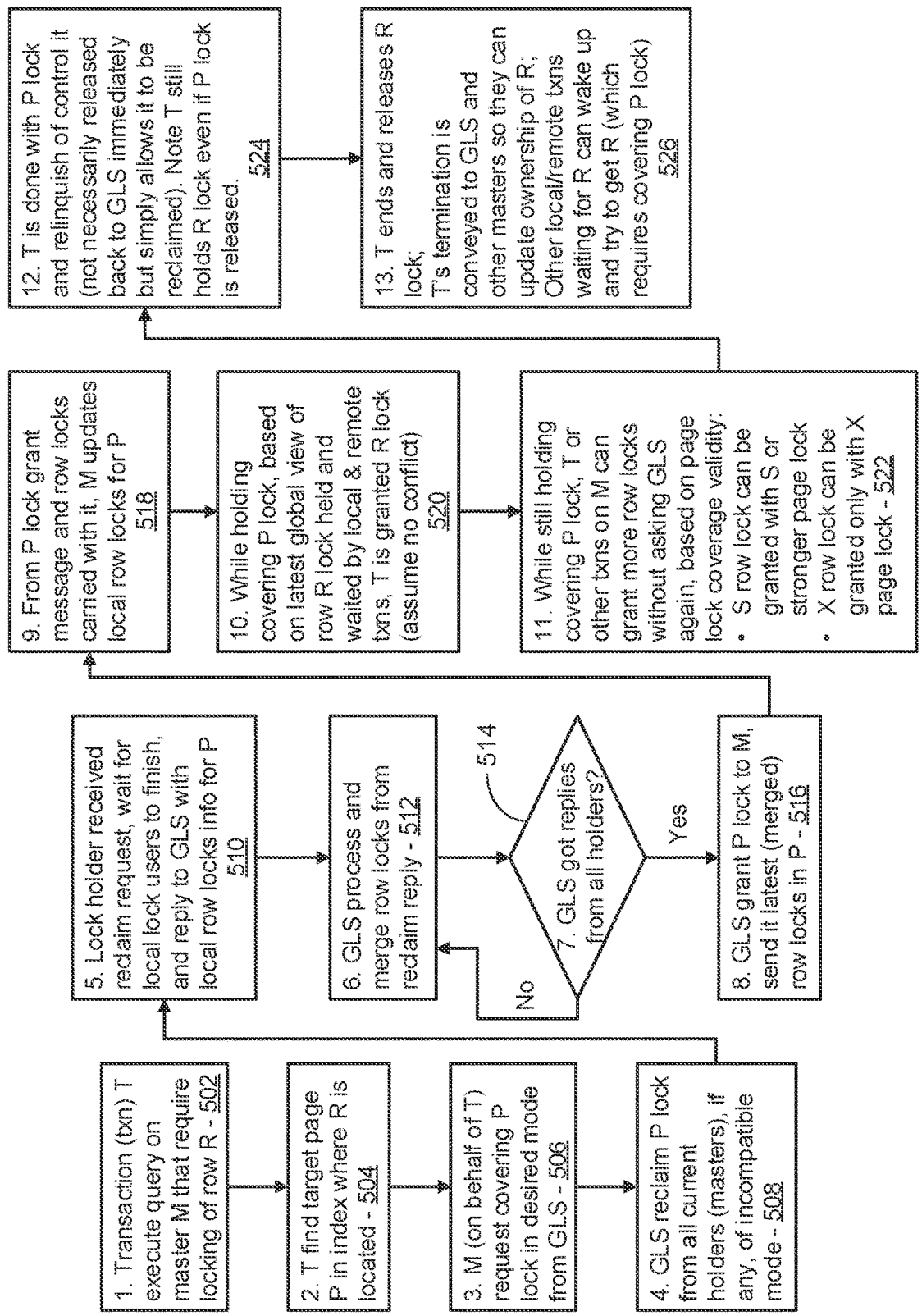
FIG. 5 illustrates a high-level flow of a row locking protocol, according to an embodiment of the present disclosure.

A high-level flow of row locking protocols described herein are illustrated in FIG. 5, according to embodiments. In step 502, a database master 210, M, executes a transaction, T, that requires the locking of a row, R. In step 504, the transaction finds the target page, P, in which the row is located. In step 506, the database master 210, on behalf of the transaction, requests the covering page lock in the desired mode (shared, shared-exclusive, or exclusive mode) from a page locking manager 208 (also referred to as a GLS). In step 508, if required, the page locking manager 208 reclaims the page lock from all current holders (other database masters) that hold a lock on the page in an incompatible mode, as illustrated in FIG. 8 and FIG. 9. If it is not required to reclaim page locks, the method proceeds to step 516 where the page locking manager 208 grants a page lock to the database master 210. The grant message from the page locking manager 208 to the database master 210 includes any (merged) row lock information for rows in the page. In step 518, from the page lock grant message and row lock information carried in the grant message, the database master 210 updates its local row lock information for the page. In step 520, while holding the covering page lock, and based on the latest global view of the row locks held and waited on by other local & remote transactions, the transaction may be granted the row lock, assuming no conflict situation exists. Finally, in step 526, the transaction ends and releases the row lock. The transaction's termination is conveyed to the page locking manager 208 and other database masters so they can update ownership information of the row. Other local and remote transactions waiting to obtain a row lock on the row can wake up and try to get a lock for the row (which also requires a covering page lock.)

In step 508, if there are other holders of the page lock, the protocol proceeds to step 510. In step 510, database masters that presently hold the page lock receive the reclaim request. If required, they wait for their local lock users to finish their operations that require the page lock. Then the lock holders reply to the page locking manager 208, including local row lock information for the page. In step 512, the page locking manager 208 processes the reply from the lock holding data master and merges row locks from the reclaim reply. In step 514, the page locking manager 208 waits until it has received reclaim replies from all rock holders that had reclaim requests sent to them, and then proceeds onto step 516.

In step 522, while holding the covering page lock, the database master 510 may grant more row locks to the transaction or other transactions without asking the page locking manager 208 again, based on allowable page lock coverage validity. In brief, a shared row lock may be granted with a shared or stronger (shared-exclusive mode or exclusive mode) covering page lock. An exclusive row lock may be granted only if the covering page lock is in exclusive mode.

Figure 6:
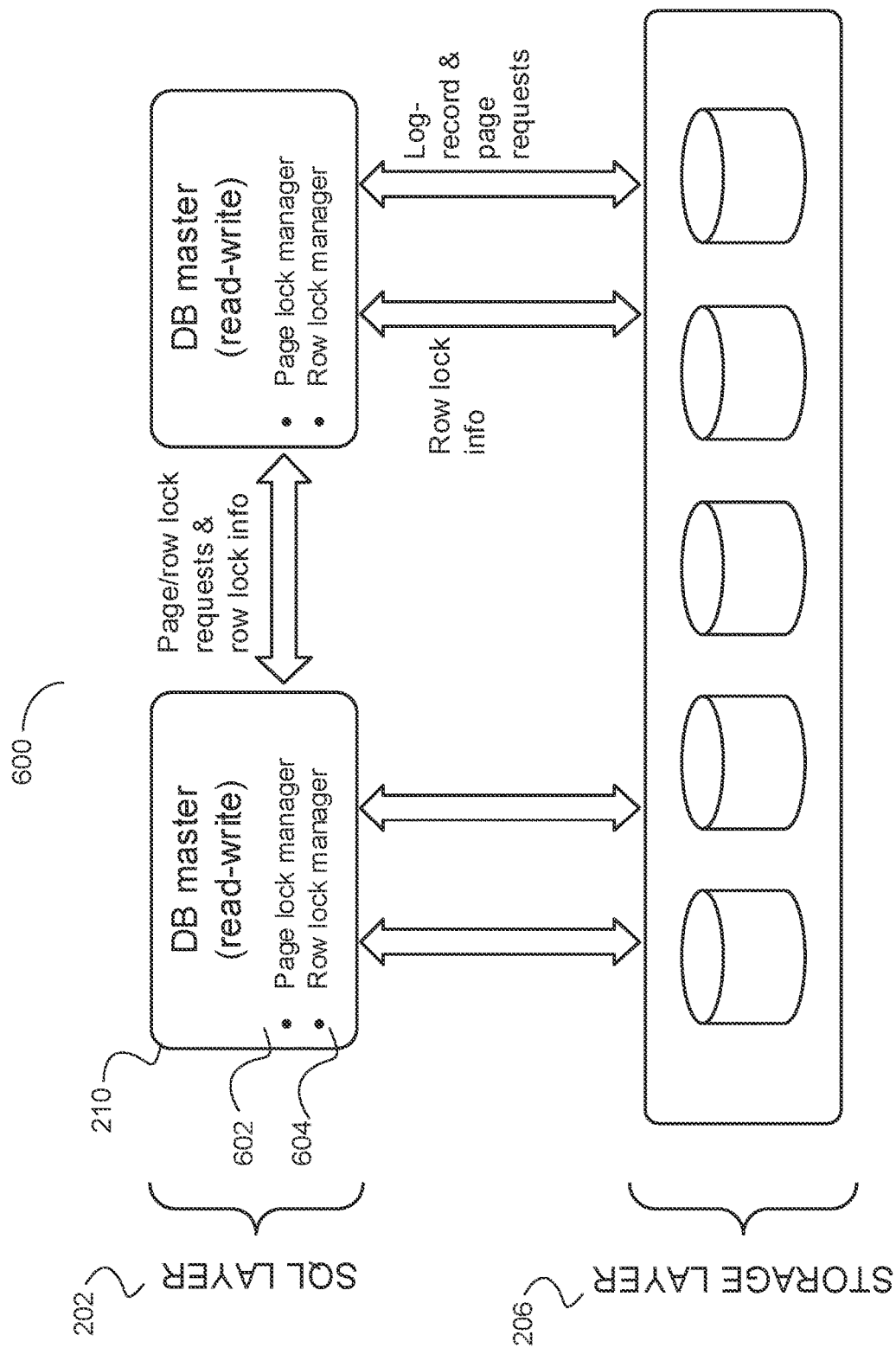
FIG. 6 illustrates a page and row lock manager, according to an embodiment of the present disclosure.

With reference to FIG. 6, in embodiments, the MM database system 600 may consist of a distributed page lock managers 208 and distributed row locks managers associated with database masters 210. Since a centralized global page lock manager 208 is absent, the page lock management function is distributed across different database masters in the MM cluster 600. The system has a mechanism to determine the current lock master for a particular page lock and all requests for that page lock are directed to that database master for scheduling and arbitration. Locking methods and protocols as described herein regarding the architecture of FIG. 2 may also be implements in the architecture 600 of FIG. 6.

Figure 10:
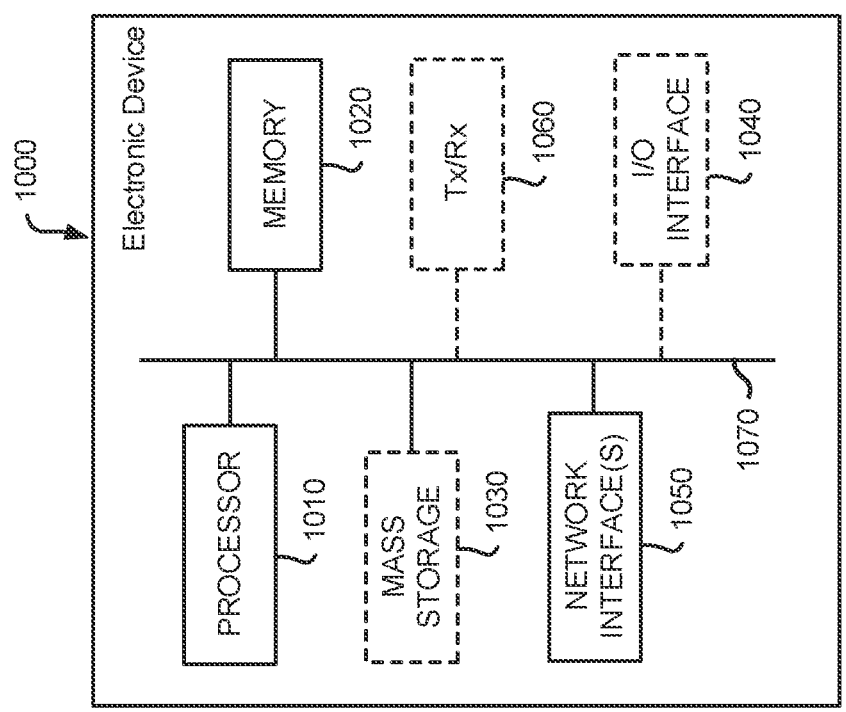
FIG. 10 provides a schematic diagram of a computing device that be used to implement embodiments of the present disclosure as described herein.

FIG. 10 is a schematic diagram of a computing device 1000, one of more of which may be used to implement embodiments of the present disclosure as described herein. Database masters, row locking managers, page locking managers, communications devices, etc., may all include computing devices as described. It is also noted that computing devices directing operations of embodiments of the present disclosure may be or include microcontrollers or microprocessors which execute program instructions stored in-memory, or other digital or analog circuitry, or a combination thereof.

As shown, the device includes a processor 1010, such as a Central Processing Unit (CPU) or specialized processors such as a Graphics Processing Unit (GPU) or other such processor unit, memory 1020, non-transitory mass storage 1030, I/O interface 1040, network interface 1050, and a transceiver 1060, all of which are communicatively coupled via bi-directional bus 1070. According to certain embodiments, any or all of the depicted elements may be utilized, or only a subset of the elements. Further, the device 1000 may contain multiple instances of certain elements, such as multiple processors, memories, or transceivers. Also, elements of the hardware device may be directly coupled to other elements without the bi-directional bus.

The memory 1020 may include any type of non-transitory memory such as static random access memory (SRAM), dynamic random access memory (DRAM), synchronous DRAM (SDRAM), read-only memory (ROM), any combination of such, or the like. The mass storage element 1030 may include any type of non-transitory storage device, such as a solid state drive, hard disk drive, a magnetic disk drive, an optical disk drive, USB drive, or any computer program product configured to store data and machine executable program code. According to certain embodiments, the memory 1020 or mass storage 1030 may have recorded thereon statements and instructions executable by the processor 1010 for performing any of the aforementioned method steps described above.

It will be appreciated that, although specific embodiments of the technology have been described herein for purposes of illustration, various modifications may be made without departing from the scope of the technology. The specification and drawings are, accordingly, to be regarded simply as an illustration of the disclosure as defined by the appended claims, and are contemplated to cover any and all modifications, variations, combinations or equivalents that fall within the scope of the present disclosure. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a database node, storage layer node, lock manager, or the like and pursuant to one or more, or a part of one or more, program elements, modules or objects generated from any programming language, such as C++, Java, or the like. In addition, each step, or a file or object or the like implementing each said step, may be executed by special purpose hardware or a circuit module designed for that purpose.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method of managing locks in a database, the method comprising:
   receiving, by a row lock manager of a database master, from a transaction executing on the database master, a row lock request for a row in the database, the row lock request including a page in the database where the row is located, the row lock request including a row lock mode of sufficient strength to perform the transaction;
   sending, by the row lock manager, to a page lock manager, a request for a covering lock of the page, the request specifying a page lock mode of sufficient strength to satisfy the row lock mode;
   receiving, by the row lock manager, from the page lock manager, a grant of the page lock, the page lock including information on row locks of rows located in the page; and
   granting, by the row lock manager, to the transaction, the row lock, only if the page lock mode is the same or stronger than the row lock mode.

2. The method of claim 1 wherein, prior to the page lock manager granting the page lock to the row lock manager, the page lock manager reclaims, a second page lock for the page, the second page lock being held by a second database master in an incompatible mode, and receives, from the second database master, a reply including second row lock information of rows located in the page, the page lock manager merging the second row lock information into the page lock.

3. The method of claim 1, further comprising, sending, by the row lock manager, to the page lock manager, a release of the page lock, the release of the page lock including local row lock information of rows located in the page, the local row lock information being local to the database master, the local row lock information to be merged by the page lock manager into the page lock.

4. The method of claim 1 further comprising:
   receiving, by the row lock manager, from a second transaction, a second row lock request for a second row located in the page, the second row lock request including a second row lock mode of sufficient strength to perform the second transaction;
   determining, by the row lock manager, that the page lock mode is sufficiently strong compared to the second row lock mode; and
   granting, by the row lock manager, to the second transaction, the grant of the second row lock.

5. The method of claim 1 wherein the page lock mode includes one of a shared page lock mode, a shared-exclusive page lock mode, and an exclusive page lock mode, and the row lock mode includes one of a shared row lock mode and an exclusive row lock mode, and the exclusive row lock mode is only granted when the page lock mode is the exclusive page lock mode, and the shared row lock mode is granted when the page lock mode is one of the shared page lock mode, the shared-exclusive page lock mode, or the exclusive page lock mode.

6. The method of claim 1 further comprising:
releasing, by the row lock manager, in response to the transaction terminating, the row lock; and
sending, by the row lock manager, an ID of the transaction to the page lock manager indicating the release of the row lock.

7. The method of claim 6, wherein the row lock data structure further includes a list of transaction waiters for the row lock and an offset.

8. The method of claim 1 wherein the page lock includes a page lock data structure, the page lock data structure including a page ID, the page lock mode, owner information, a page version number (PVN), and a row lock data structure, the row lock data structure including an owner of the row lock.

9. A method of managing locks in a database, the method comprising:
receiving, by a row lock manager of a database master, from a transaction executing on the database master, a row lock request for a row in the database, the row lock request including a page in the database where the row is located, the row lock request including a row lock mode of sufficient strength to perform the transaction;
sending, by the row lock manager, to a page lock manager, a request for a covering lock of the page, the request specifying a page lock mode of sufficient strength to satisfy the row lock mode;
receiving, by the row lock manager, from the page lock manager, a grant of the page lock, the page lock including information on row locks of rows located in the page;
granting, by the row lock manager, to the transaction, the row lock; and
updating, by the row lock manager, using the row lock information, local row lock information of the row lock manager.

10. A row lock manager of a database master comprising:
a processor; and
a non-transitory memory for storing instructions that when executed by the processor cause the row lock manager to be configured to be operable to:
receive, from a transaction executing on the database master, a row lock request for a row in the database, the row lock request including a page in the database where the row is located, the row lock request including a row lock mode of sufficient strength to perform the transaction;
send, to a page lock manager, a request for a covering lock of the page, the request specifying a page lock mode of sufficient strength to satisfy the row lock mode;
receive, from the page lock manager, a grant of the page lock, the page lock including information on row locks of rows located in the page; and
grant, to the transaction, the row lock, only if the page lock mode is the same or stronger than the row lock mode.

11. The row lock manager of a database master of claim 10, wherein, prior to the page lock manager granting the page lock to the row lock manager, the page lock manager reclaims, a second page lock for the page, the second page lock being held by a second database master in an incompatible mode, and receives, from the second database master, a reply including second row lock information of rows located in the page, the page lock manager merging the second row lock information into the page lock.

12. The row lock manager of a database master of claim 10, the row lock manager to be further configured to be operable to:
send, by the row lock manager, to the page lock manager, a release of the page lock, the release of the page lock including local row lock information of rows located in the page, the local row lock information being local to the database master, the local row lock information to be merged by the page lock manager into the page lock.

13. The row lock manager of a database master of claim 10, wherein the grant of the page lock includes row lock information of rows located in the page, the row lock manager to be further configured to be operable to:
updating, by the row lock manager, using the row lock information, local row lock information of the row lock manager.

14. The row lock manager of a database master of claim 10, the row lock manager to be further configured to be operable to:
receiving, by the row lock manager, from a second transaction, a second row lock request for a second row located in the page, the second row lock request including a second row lock mode of sufficient strength to perform the second transaction;
determining, by the row lock manager, that the page lock mode is sufficiently strong compared to the second row lock mode; and
granting, by the row lock manager, to the second transaction, the grant of the second row lock.

15. The row lock manager of a database master of claim 10, wherein the page lock mode includes one of a shared page lock mode, a shared-exclusive page lock mode, and an exclusive page lock mode, and the row lock mode includes one of a shared row lock mode and an exclusive row lock mode, and the exclusive row lock mode is only granted when the page lock mode is the exclusive page lock mode, and the shared row lock mode is granted when the page lock mode is one of the shared page lock mode, the shared-exclusive page lock mode, or the exclusive page lock mode.

16. The row lock manager of a database master of claim 10, the row lock manager to be further configured to be operable to:
releasing, by the row lock manager, in response to the transaction terminating, the row lock; and
sending, by the row lock manager, an ID of the transaction to the page lock manager indicating the release of the row lock.

17. The row lock manager of a database master of claim 10, wherein the page lock includes a page lock data structure, the page lock data structure including a page ID, the page lock mode, owner information, a page version number (PVN), and a row lock data structure, the row lock data structure including an owner of the row lock.

18. The row lock manager of a database master of claim 10, wherein the row lock data structure further includes a list of transaction waiters for the row lock and an offset.

* * * * *